(12) United States Patent
Ganti et al.

(10) Patent No.: US 12,547,594 B2
(45) Date of Patent: Feb. 10, 2026

(54) SPATIAL-TEMPORAL STORAGE SYSTEM, METHOD, AND RECORDING MEDIUM

(71) Applicant: International Business Machines Corporation, Armonk, NY (US)

(72) Inventors: Raghu Kiran Ganti, Elmsford, NY (US); Shen Li, Urbana, IL (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 17/482,651

(22) Filed: Sep. 23, 2021

(65) Prior Publication Data

US 2022/0012213 A1 Jan. 13, 2022

Related U.S. Application Data

(63) Continuation of application No. 16/056,672, filed on Aug. 7, 2018, now Pat. No. 11,372,821, which is a
(Continued)

(51) Int. Cl.
*G06F 16/182* (2019.01)
*G06F 16/22* (2019.01)
*G06F 16/2452* (2019.01)
*G06F 16/2453* (2019.01)
*G06F 16/2458* (2019.01)
*G06F 16/27* (2019.01)
(Continued)

(52) U.S. Cl.
CPC ........ *G06F 16/1844* (2019.01); *G06F 16/221* (2019.01); *G06F 16/2264* (2019.01); *G06F 16/2452* (2019.01); *G06F 16/2453* (2019.01); *G06F 16/2477* (2019.01); *G06F 16/275* (2019.01); *G06F 16/284* (2019.01); *G06F 16/9537* (2019.01)

(58) Field of Classification Search
CPC ............ G06F 16/1844; G06F 16/2477; G06F 16/275; G06F 16/284; G06F 16/2452; G06F 16/2453; G06F 16/221; G06F 16/2264; G06F 16/9537
See application file for complete search history.

(56) References Cited

U.S. PATENT DOCUMENTS

| | | |
|---|---|---|
| 6,172,935 B1 | 1/2001 | Wright et al. |
| 6,684,219 B1 | 1/2004 | Shaw et al. |

(Continued)

FOREIGN PATENT DOCUMENTS

| | | | | |
|---|---|---|---|---|
| CN | 101105396 A | * | 1/2008 | ............ G06T 17/00 |
| CN | 102306166 A | * | 1/2012 | |

(Continued)

OTHER PUBLICATIONS

United States Notice of Allowance dated Apr. 20, 2022, in co-pending U.S. Appl. No. 16/056,672.
(Continued)

*Primary Examiner* — Neveen Abel Jalil
*Assistant Examiner* — Hubert Cheung
(74) *Attorney, Agent, or Firm* — Jordan T. Schiller

(57) ABSTRACT

A spatial-temporal storage method, system, and non-transitory computer readable medium include dynamically managing a plurality of region servers for querying spatiotemporal data in noSQL databases.

6 Claims, 15 Drawing Sheets

SPATIAL-TEMPORAL STORAGE METHOD 200

Related U.S. Application Data continuation of application No. 15/064,161, filed on Mar. 8, 2016, now Pat. No. 10,108,637.

(51) Int. Cl.
  *G06F 16/28* (2019.01)
  *G06F 16/9537* (2019.01)

(56) References Cited

U.S. PATENT DOCUMENTS

| | | | |
|---|---|---|---|
| 6,879,980 B1* | 4/2005 | Kothuri | G06F 16/29 707/999.005 |
| 7,167,856 B2 | 1/2007 | Lawder | |
| 7,356,526 B2* | 4/2008 | Gao | G06F 16/24547 707/999.005 |
| 7,567,973 B1* | 7/2009 | Burrows | G06F 16/22 |
| 7,991,779 B1 | 8/2011 | Drory et al. | |
| 8,055,687 B2 | 11/2011 | Zhang et al. | |
| 8,099,380 B1* | 1/2012 | Shahabi | H04W 4/023 706/62 |
| 8,214,371 B1 | 7/2012 | Ramesh et al. | |
| 8,688,723 B2 | 4/2014 | Zhang et al. | |
| 8,713,073 B2* | 4/2014 | Johnston | G06F 16/219 707/673 |
| 8,806,350 B2* | 8/2014 | Krishnan | H04L 67/535 715/747 |
| 9,288,617 B1* | 3/2016 | Rice | H04W 4/021 |
| 9,965,209 B2* | 5/2018 | Rao | G06T 11/206 |
| 10,394,787 B2* | 8/2019 | Zhang | G06F 16/29 |
| 10,929,501 B2* | 2/2021 | Kazmaier | G06F 17/10 |
| 11,372,821 B2 | 6/2022 | Ganti et al. | |
| 11,379,271 B2* | 7/2022 | Guan | G06F 9/485 |
| 2002/0156779 A1* | 10/2002 | Elliott | G06F 16/9537 |
| 2003/0204499 A1 | 10/2003 | Shahabi et al. | |
| 2003/0233403 A1* | 12/2003 | Bae | G06F 16/95 707/E17.107 |
| 2004/0117359 A1* | 6/2004 | Snodgrass | G06F 16/2477 |
| 2004/0249809 A1 | 12/2004 | Ramani et al. | |
| 2005/0015216 A1 | 1/2005 | V. Kothuri | |
| 2005/0071331 A1 | 3/2005 | Gao et al. | |
| 2006/0004707 A1* | 1/2006 | Dettinger | G06F 16/2425 |
| 2006/0092782 A1 | 5/2006 | Takaba | |
| 2006/0106930 A1* | 5/2006 | Shaffer | H04L 67/52 709/224 |
| 2007/0033354 A1* | 2/2007 | Burrows | G06F 16/184 711/156 |
| 2008/0076418 A1 | 3/2008 | Beyer, Jr. | |
| 2008/0310729 A1* | 12/2008 | Yoshino | G06V 30/18143 382/190 |
| 2009/0210413 A1* | 8/2009 | Hayashi | G06F 18/24147 707/999.005 |
| 2010/0125562 A1 | 5/2010 | Nair et al. | |
| 2010/0125569 A1 | 5/2010 | Nair et al. | |
| 2010/0125604 A1 | 5/2010 | Martinez et al. | |
| 2010/0185692 A1* | 7/2010 | Zhang | G06F 16/2264 707/E17.071 |
| 2010/0281017 A1* | 11/2010 | Hu | G06F 16/2453 707/718 |
| 2010/0332495 A1* | 12/2010 | Richter | G06F 16/2474 707/769 |
| 2011/0153650 A1* | 6/2011 | Lee | G06F 16/10 707/769 |
| 2012/0166446 A1 | 6/2012 | Bowman et al. | |
| 2012/0265764 A1 | 10/2012 | Agrawal et al. | |
| 2012/0274775 A1 | 11/2012 | Reiffel | |
| 2013/0054552 A1* | 2/2013 | Hawkins | G06N 20/00 707/706 |
| 2013/0072223 A1 | 3/2013 | Berenberg et al. | |
| 2013/0191458 A1* | 7/2013 | Krishnan | H04L 67/535 709/204 |
| 2013/0268490 A1* | 10/2013 | Keebler | G06F 16/954 707/627 |
| 2013/0318051 A1 | 11/2013 | Kumar et al. | |
| 2013/0325343 A1* | 12/2013 | Blumenberg | G06F 3/04883 701/533 |
| 2014/0046638 A1* | 2/2014 | Peloski | G06F 16/2246 703/6 |
| 2014/0164382 A1* | 6/2014 | Keebler | G06F 16/972 707/737 |
| 2014/0188825 A1* | 7/2014 | Muthukkaruppan | G06F 16/178 707/694 |
| 2014/0248899 A1* | 9/2014 | Emadzadeh | H04W 4/029 455/456.1 |
| 2014/0310243 A1 | 10/2014 | McGee et al. | |
| 2014/0337472 A1* | 11/2014 | Newton | H04L 65/612 709/217 |
| 2014/0344399 A1* | 11/2014 | Lipstone | H04L 41/509 709/217 |
| 2015/0046411 A1 | 2/2015 | Kazmaier et al. | |
| 2015/0121371 A1* | 4/2015 | Gummaraju | G06F 16/182 718/1 |
| 2015/0199699 A1* | 7/2015 | Milton | H04W 4/029 705/7.34 |
| 2015/0220659 A1* | 8/2015 | Rissanen | G06F 21/6218 707/759 |
| 2015/0310082 A1* | 10/2015 | Han | G06F 16/254 707/602 |
| 2015/0324373 A1 | 11/2015 | Tyercha et al. | |
| 2016/0077746 A1 | 3/2016 | Muth et al. | |
| 2016/0077936 A1* | 3/2016 | Tang | G06F 11/2097 714/4.11 |
| 2016/0103863 A1* | 4/2016 | Becker | G06F 16/211 707/741 |
| 2016/0203173 A1 | 7/2016 | Zang | |
| 2016/0342678 A1 | 11/2016 | Newman et al. | |
| 2017/0032012 A1* | 2/2017 | Zhang | G06F 16/182 |
| 2017/0068694 A1 | 3/2017 | Brodt et al. | |
| 2017/0139596 A1* | 5/2017 | Hack | G06F 3/0673 |
| 2017/0169544 A1 | 6/2017 | Boulkenafed et al. | |
| 2017/0192892 A1 | 7/2017 | Pundir et al. | |
| 2017/0243028 A1* | 8/2017 | LaFever | G06F 21/6254 |
| 2017/0262469 A1 | 9/2017 | Ganti et al. | |
| 2017/0293662 A1* | 10/2017 | Tyercha | G06F 16/2237 |
| 2019/0230151 A1 | 7/2019 | Falcao et al. | |
| 2021/0334206 A1* | 10/2021 | Colgrove | G06F 3/067 |
| 2022/0269417 A1* | 8/2022 | Sanvido | G06F 3/0608 |

FOREIGN PATENT DOCUMENTS

| | | | | |
|---|---|---|---|---|
| CN | 103646073 A | * | 3/2014 | G06F 17/30339 |
| CN | 103793493 A | * | 5/2014 | G06F 16/284 |
| CN | 103902702 A | * | 7/2014 | G06F 17/30336 |
| EP | 3149978 B1 | * | 11/2021 | G01S 5/0236 |
| JP | 3984135 B2 | * | 10/2007 | |
| KR | 20060028164 A | * | 3/2006 | |
| KR | 20110073175 A | * | 6/2011 | G06F 17/30 |
| WO | WO-03048976 A1 | * | 6/2003 | G06F 16/24556 |
| WO | WO-2004068300 A2 | * | 8/2004 | G06F 16/00 |
| WO | WO-2010059308 A2 | * | 5/2010 | G06F 17/30864 |
| WO | WO-2012139200 A1 | * | 10/2012 | G06F 17/3089 |
| WO | WO-2012140464 A1 | * | 10/2012 | G06F 17/3089 |
| WO | WO-2014061221 A1 | * | 4/2014 | G06K 9/6211 |
| WO | WO-2015180531 A1 | * | 12/2015 | G06F 16/2272 |

OTHER PUBLICATIONS

Dong et al., "Optimizing Space Amplification in RocksDB", CIDR 2017 (Year: 2017).
United States Office Action dated Feb. 17, 2022, in co-pending U.S. Appl. No. 16/056,672.
United States Office Action dated Jun. 25, 2021, in U.S. Appl. No. 16/056,672.
United States Office Action dated Apr. 23, 2021, in U.S. Appl. No. 16/056,672.
United States Office Action dated Oct. 6, 2020, in U.S. Appl. No. 16/056,672.
United States Office Action dated Sep. 1, 2020, in U.S. Appl. No. 16/056,672.

(56) References Cited

OTHER PUBLICATIONS

Mel, et al. "The NIST Definition of Cloud Computing". Recommendations of the National Institute of Standards and Technology. Nov. 16, 2015.
Li, et al., "Pyro: A Spatial-Temporal Big Data Storage System", 2015 USENIX Annual Technical Conference, Jul. 8-10, 2015. (Year: 2015).
Mark Callaghan, :Small Datum: Read, Write & Space Amplification—Pick 2 (Year: 2015).
United States Notice of Allowance dated Jun. 15, 2018 in U.S. Appl. No. 15/064,161.
United States Office Action dated May 16, 2018 in U.S. Appl. No. 15/064,161.
Karger et al., "Consistent hashing and random trees: distributed caching protocols for relieving hot spots on the World Wide Web", In Proceedings of Theory of computing (STOC '97), 1997, pp. 654-663, ACM.
Stackoverflow "Efficiently ordering locations by their geographical distance from a query point", http://stackoverflow.com/questions/8537306/efficiently-ordering-locations-by-their-geographical-distance-from-a-query-point, accessed Jan. 21, 2016, published Dec. 16, 2011, 1 page.

\* cited by examiner

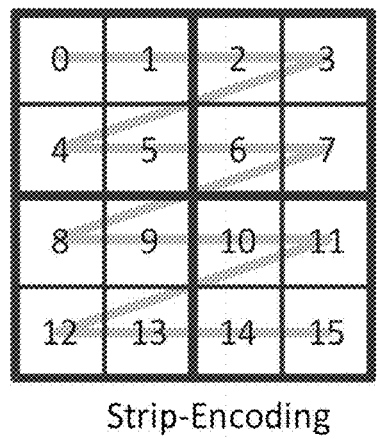
FIG. 4A
Strip-Encoding
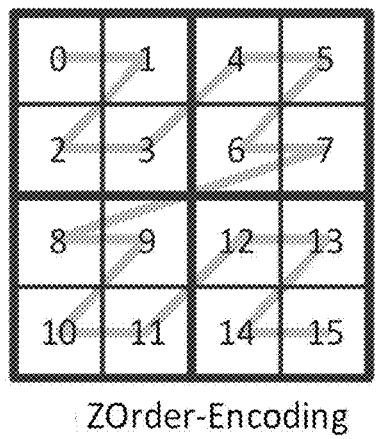
FIG. 4B
ZOrder-Encoding
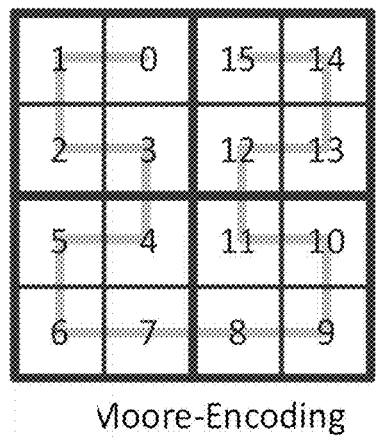
FIG. 4C
Moore-Encoding
FIG. 5
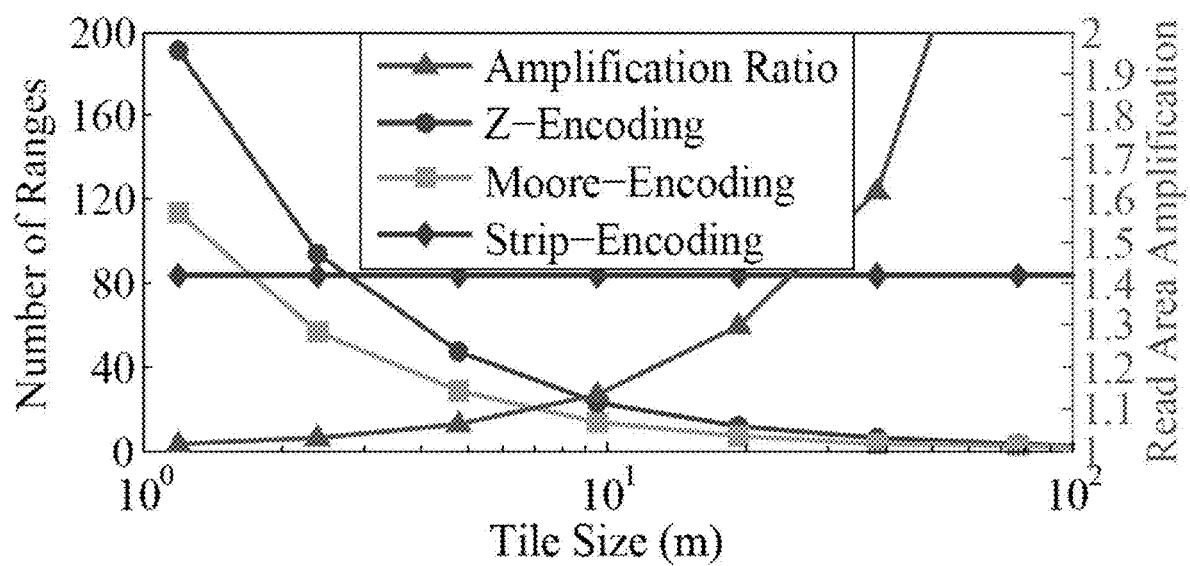

radius = 1000m

50m × 628m

SPATIAL-TEMPORAL STORAGE SYSTEM, METHOD, AND RECORDING MEDIUM

CROSS-REFERENCE TO RELATED APPLICATIONS

The present application is a Continuation Application of U.S. patent application Ser. No. 16/056,672, filed on Aug. 7, 2018, which is a Continuation Application of U.S. patent application Ser. No. 15/064,161, filed on Mar. 8, 2016, now U.S. Pat. No. 10,108,637, issued on Oct. 23, 2018, the entire contents of which are hereby incorporated by reference.

STATEMENT REGARDING FEDERALLY SPONSORED RESEARCH OR DEVELOPMENT

This invention was made with Government support under W911NF-09-2-0053 awarded by the Army Research Office (ARO). The Government has certain rights to this invention.

BACKGROUND

The present invention relates generally to a spatial-temporal, big-data storage system, and more particularly, but not by way of limitation, to system, method, and recording medium for a holistic distributed data storage solution for spatial-temporal data.

Mobile applications can generate an immense amount of spatial-temporal data, which calls for strong support from big data platforms. Conventional techniques attempt to meet this need by stacking HBase above Hadoop a Distributed File System (DFS) (e.g., a Hadoop DFS). However, as general purpose solutions, HBase and HDFS suffer from considerable inefficiencies when handling spatial-temporal data.

That is, there is a technical problem in the conventional techniques that as HBase indexes only a primary key, the spatial-temporal data requires encoding mechanisms to translate the spatial and temporal information into unique keys. The encoding algorithm is crucially important for efficiency of geometry queries, which is a common case in spatial-temporal applications. To reduce the number of HBase scan queries in the conventional techniques, the algorithm must preserve as much continuity as possible when translating high dimensional data into one-dimensional primary key space.

Also, there is a technical problem in the conventional techniques that spatial-temporal applications naturally incubate moving "hot spots". For example, tens of thousands people simultaneously searching for nearby restaurant data and transportation data after July 4th fireworks generates a large amount of requests hitting a single region server, creating a resource hot spot in the distributed storage system. The region split operation in HBase first generates reference files pointing back to the original StoreFile. The references will only be materialized during the next compaction. Therefore, the servers hosting the two daughter regions (resulting from the region split separation) suddenly host the data locality benefits, which further deteriorates the hunger of resources.

As a result of the technical problems, the conventional techniques are incapable of spatial temporal data support for both range queries within a given geometry and efficient load balancing against moving hot-spots.

SUMMARY

In an exemplary embodiment, the present invention can provide in a first layer, a geometric translation circuit configured to split spatial-temporal information into row keys and translate a geometry query into a range scan, a multi-scan optimization circuit configured to compute an optimal read strategy to optimize the range scan translated by the geometric translation circuit into a series of block starting offsets and block sizes, and, in a second layer, a block grouping circuit configured to allow grouping of blocks in the second layer while preserving spatial data locality when splits of spatial-temporal information occur in the first layer.

Further, in another exemplary embodiment, the present invention can provide a non-transitory computer-readable recording medium recording a spatial-temporal storage program, the program causing a computer to perform: in a first layer, splitting spatial-temporal information into row keys and translate a geometry query into a range scan, computing an optimal read strategy to optimize the range scan translated by the geometric translation circuit into a series of block starting offsets and block sizes, and in a second layer, grouping of blocks in the second layer while preserving spatial data locality when splits of spatial-temporal information occur in the first layer.

Even further, in another exemplary embodiment, the present invention can provide a spatial-temporal storage method, including in a first layer, splitting spatial-temporal information into row keys and translate a geometry query into a range scan, computing an optimal read strategy to optimize the range scan translated by the geometric translation circuit into a series of block starting offsets and block sizes, and in a second layer, grouping of blocks in the second layer while preserving spatial data locality when splits of spatial-temporal information occur in the first layer.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and technology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 4A exemplarily shows Strip-encoding of a geometric translation circuit 101.

FIG. 4B exemplarily shows ZOrder-encoding of the geometric translation circuit 101.

FIG. 4C exemplarily shows Moore-encoding of the geometric translation circuit 101.

FIG. 5 exemplarily shows experimental results of each of the encoding techniques of FIGS. 4A-4C.

DETAILED DESCRIPTION

Figure 1:
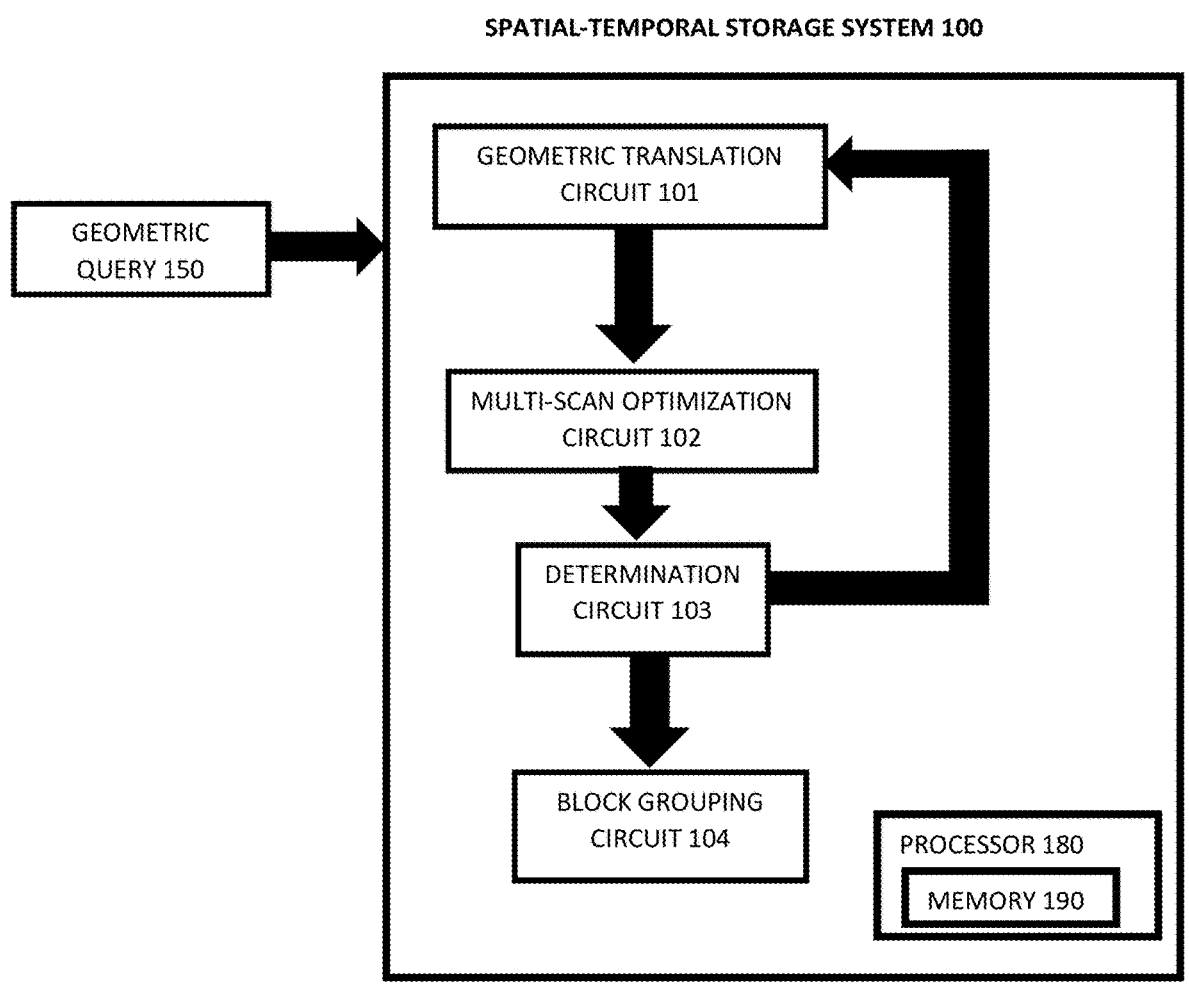
FIG. 1 exemplarily shows a block diagram illustrating a configuration of a spatial-temporal storage system 100.

The invention will now be described with reference to FIGS. 1-21, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the spatial-temporal storage system 100 includes a geometric translation circuit 101, a multi-scan optimization circuit 102, a determination circuit 103, and a block grouping circuit 104. The spatial-temporal storage system 100 includes a processor 180 and a memory 190, with the memory 190 storing instructions to cause the processor 180 to execute each circuit of spatial-temporal storage system 100. The processor and memory may be physical hardware components, or a combination of hardware and software components.

Although the spatial-temporal storage system 100 includes various circuits, it should be noted that a spatial-temporal storage system can include modules in which the memory 190 stores instructions to cause the processor 180 to execute each module of spatial-temporal storage system 100.

Also, each circuit can be a stand-alone circuit, unit, etc. that can be interconnected to cooperatively produce a transformation to a result. Each circuit can act as a processing component.

With the use of these various circuits, the spatial-temporal storage system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space, etc.) within a lower-dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower-dimensional feature space, is used to identify the emergence of a certain cognitive state over that period of time. One or more preferred embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Figure 19:
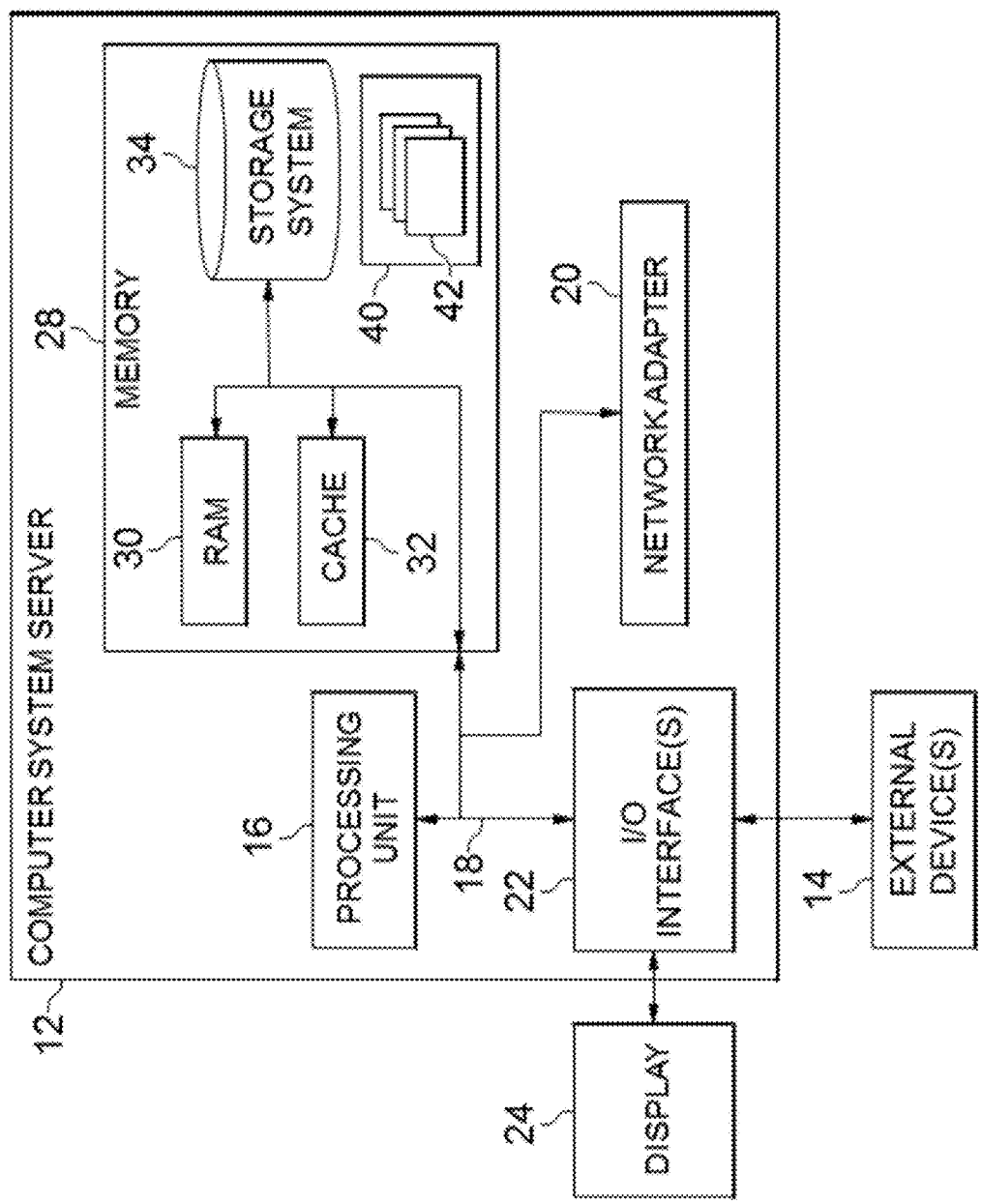
FIG. 19 depicts a cloud computing node 10 according to an embodiment of the present invention.
Figure 20:
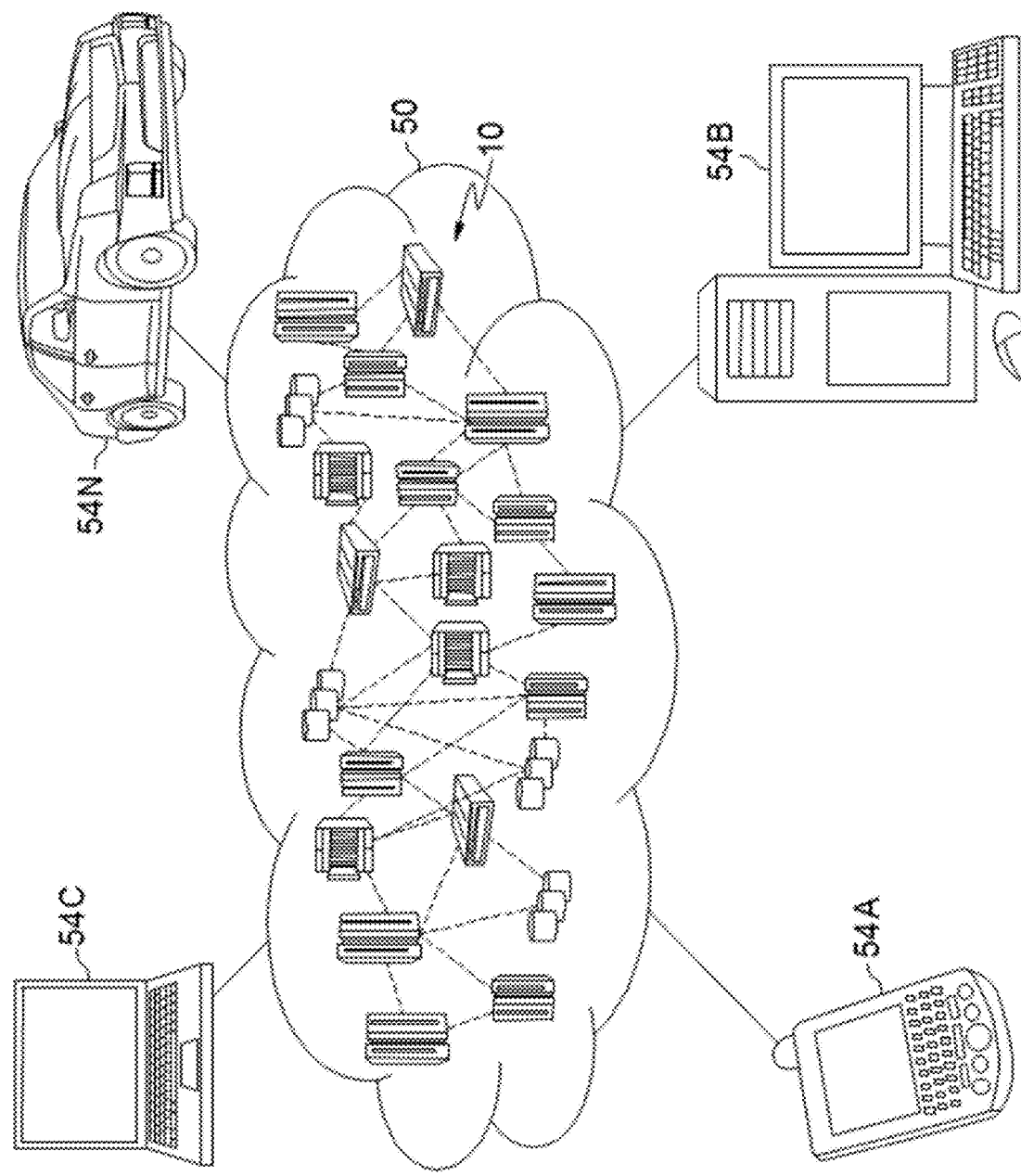
FIG. 20 depicts a cloud computing environment 50 according to another embodiment of the present invention.
Figure 21:
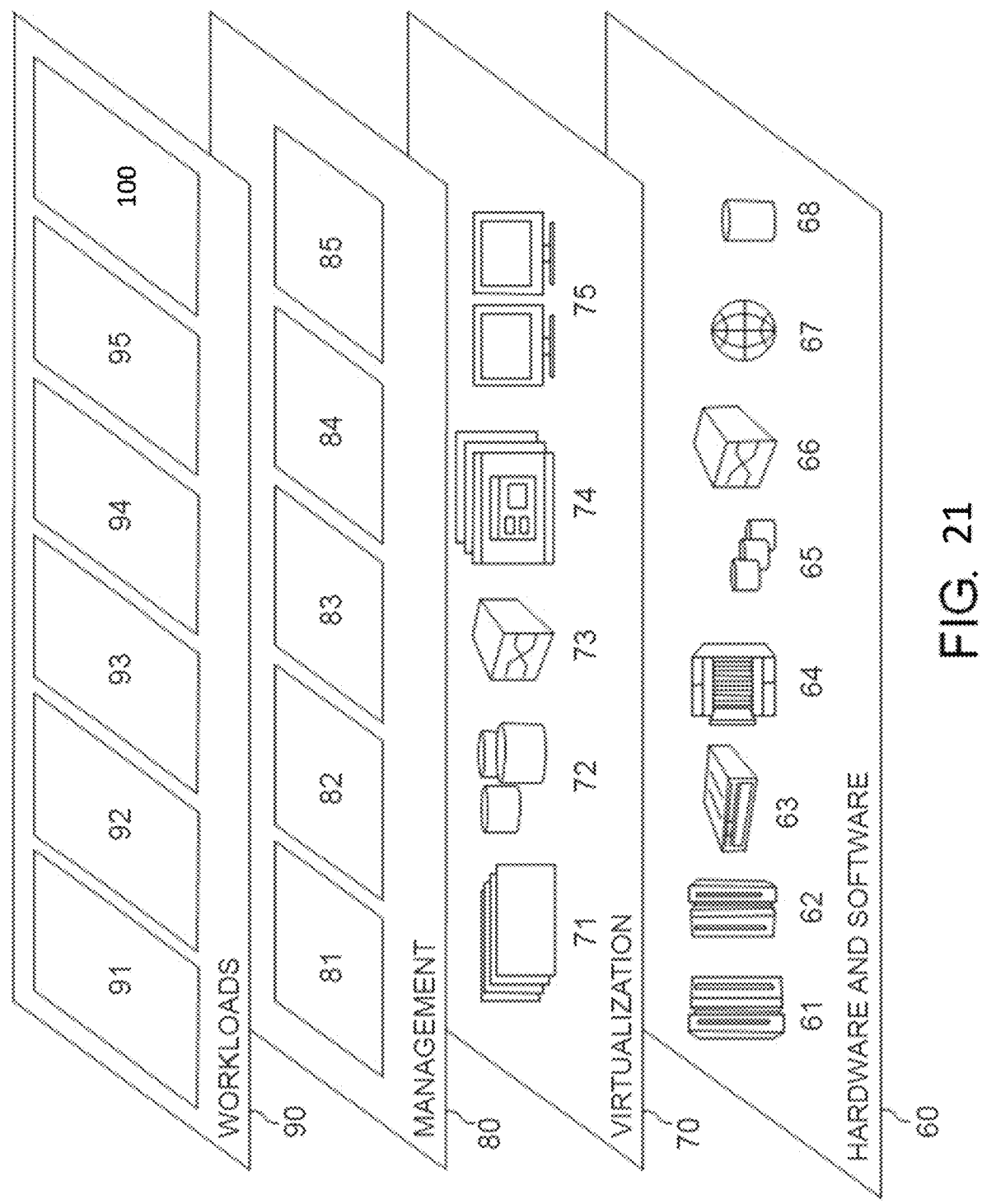
FIG. 21 depicts abstraction model layers according to yet another embodiment of the present invention.

Although as shown in FIGS. 19-21 and as described later, the computer system/server 12 is exemplarily shown in cloud computing node 10 as a general-purpose computing circuit which may execute in a layer the spatial-temporal storage system 100 (FIG. 21), it is noted that the present invention can be implemented outside of the cloud environment.

Figure 3:
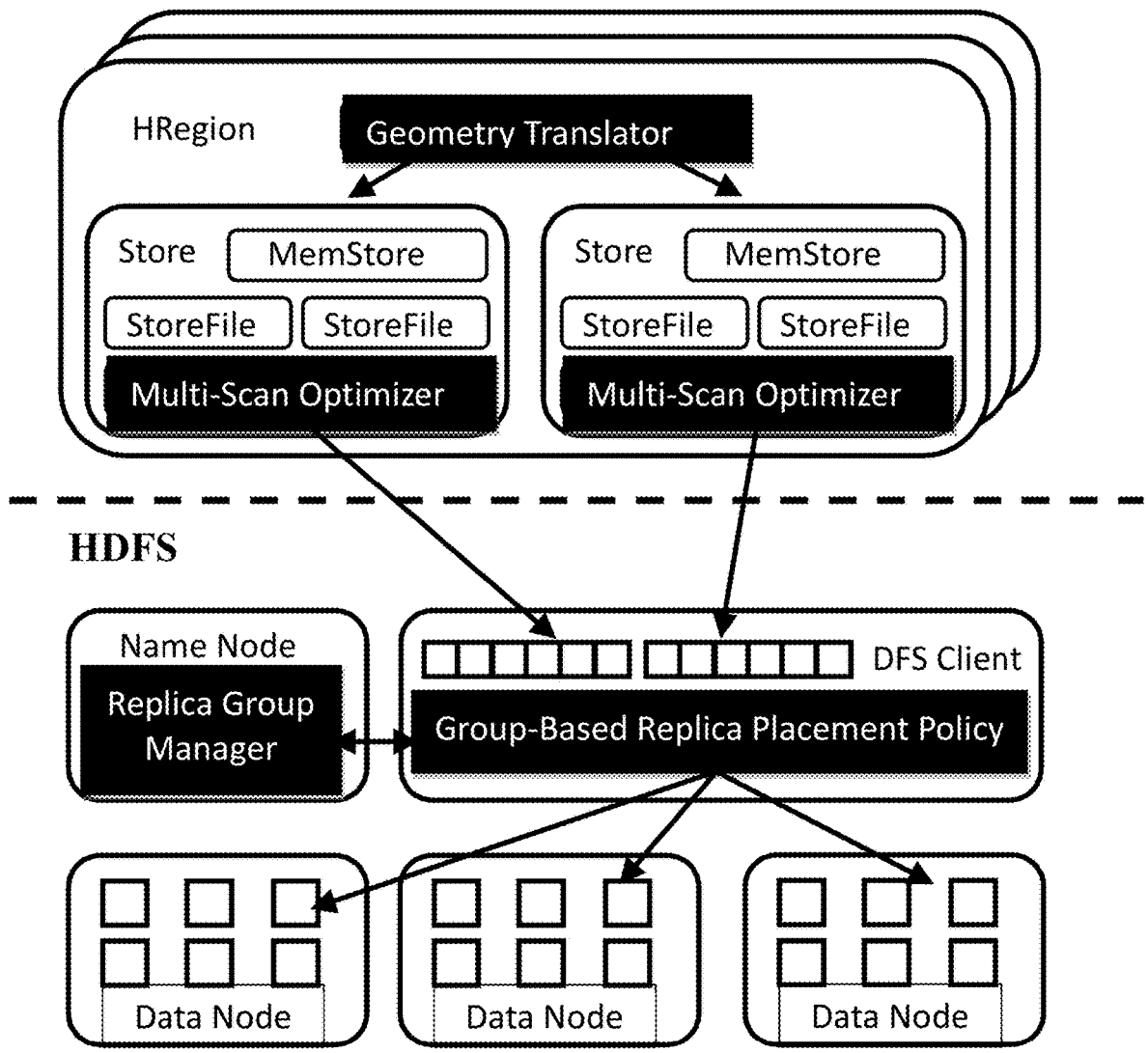
FIG. 3 exemplarily shows the spatial-temporal storage system 100 on a first layer (e.g., an HBase layer and an HDFS layer).

Referring generally to FIG. 3 which exemplarily shows a modified HBase and HDFS, HBase is a distributed, non-relational database running on top of HDFS. HBase organizes data into a 3D table of rows, columns, and cell versions. Each column belongs to a column family. HBase stores the 3D table as a key-value store. The key consists of row key, column family key, column qualifier, and timestamp. The value contains the data stored in the cell.

In HBase, the entire key space is partitioned into regions, with each region served by an HRegion instance. HRegion manages each column family using a Store (i.e., a storage of memory). Each Store contains one MemStore (i.e., memory storage) and multiple Store-Files. In the write path, the data first stays in the Mem-Store. When the MemStore reaches some pre-defined flush threshold, all key-value pairs in the MemStore are sorted and flushed into a new StoreFile in HDFS. Each StoreFile wraps an HFile, consisting of a series of data blocks followed by meta blocks. In this disclosure, "meta blocks" are used to represent all blocks that store meta, data index, or meta index. In the read path, a request first determines the right HRegions to query, then it searches all StoreFiles in those regions to find target key-value pairs.

As the number of StoreFiles increases, HBase merges them into larger StoreFiles to reduce the overhead of read operations. When the size of a store increases beyond a threshold, its HRegion splits into two daughter regions, with each region handling roughly half of its parent's key-space. The two daughter regions initially create reference files pointing back to StoreFiles of their past parent region. This design postpones the overhead of copying region data to daughter region servers at the cost of losing data locality benefits. The next major compaction materializes the reference file into real StoreFiles.

Many location-based services share the same request primitive that queries information about moving objects within a given geometry (i.e., geometry query 150). All cells HBase are ordered based on their keys in a one-dimensional space. Casting a geometry into that one-dimensional space inevitably results in multiple disjoint range scans. HBase handles those range scans individually, preventing queries to be aggregately optimized. Moreover, location-based workloads naturally create moving hotspots in the backend, requiring responsive resource elasticity in every HRegion. HBase achieves responsive elasticity by efficiently splitting regions, which sacrifices data locality benefits for newly created daughter regions. Without data locality, requests will suffer increased response time after splits.

It is noted that the geometric translation circuit 101, multi-scan optimization circuit 102, and the determination circuit 103 operate at the HBase level while the block grouping circuit 104 operates at the HDFS level. In other words, the geometric translation circuit 101, multi-scan optimization circuit 102, and the determination circuit 103 perform functions within the HBase layer (i.e., within the modified. HBase code) and the block grouping circuit 104 operates at the HDFS layer (i.e., within the modified HDFS code). The respective layers communicate with each other.

Referring to FIG. 1, the spatial-temporal system 100 uses a Moore encoding algorithm to cast two-dimensional data into one-dimensional Moore index, which is enclosed as part of the row key. It is noted that the invention is not limited to Moore encoding and other algorithms can be used, such as ZOrder-encoding, Strip encoding, etc.

Figure 7:
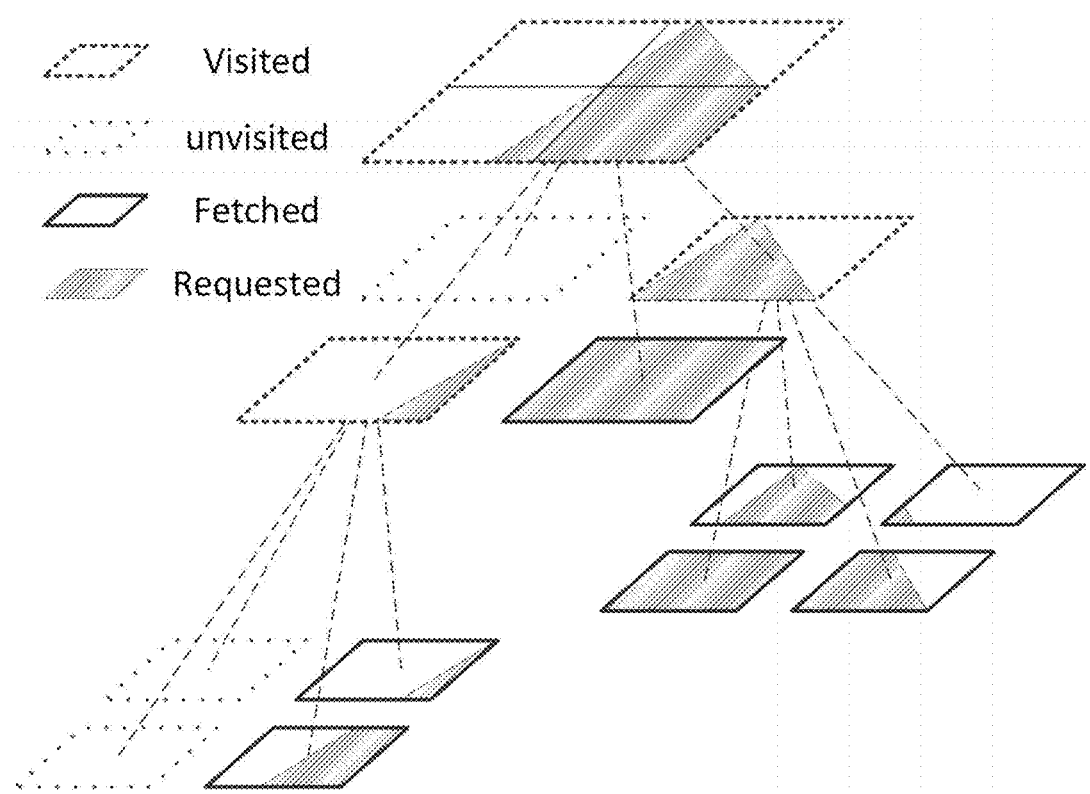
FIG. 7 exemplarily shows recursively splitting the geometric query 150 into tiles using a quad-tree.

The spatial-temporal system 100 receives a geometric query 150. The geometric translation circuit 100 applies an algorithm (e.g., the Moore encoding algorithm) to calculate scan ranges. That is, the space of the geometric query is recursively divided into tiles using a quad-tree as shown in FIG. 7. Then the tiles are encoded using a space filling curve (i.e., Z, Moore, Hilbert, etc). The same quad-tree is used to calculate the tiles that intersect with the geometry. The tiles are turned into range scans.

In order to store spatial-temporal data, the geometric translation circuit 101 casts 2D coordinates (x, y) into the one-dimensional key space. The geometric translation circuit 101 can use a fixed number of bits to represent x, and y, and append x after y to form the spatial key. This leads to the Strip-encoding as shown in FIG. 4A. The geometric translation circuit can also use ZOrder-encoding that interleaves the bits of x and y as shown in FIG. 4B. These encoding algorithms divide the 2D space into m×m tiles, and index each tile with a unique ID. The tile is the spatial encoding unit as well as the unit of range scans.

However, the resolution can be defined as $\log_2(m)$, which is the minimum number of bits required to encode the largest value of coordinate x or y. In most cases, encoding algorithms inevitably break a two-dimensional geometry into multiple key ranges. Therefore, each geometry query 150 can result in multiple range scans. Each range scan requires a few indexing, caching, and disk operations to process. Therefore, it is more preferable to keep the number of range scans low.

As shown in FIG. 5, the number of range scans that a geometry query may generate are evaluated. The resolution ranges from 25 to 18 over the same set of randomly generated disk-shaped geometry queries in a 40,000,000 m×40,000,000 m area. The corresponding tile size ranges from 1.2 m to 153 m. FIG. 5 exemplarily shows the number of range scans generated by a single geometry query 150 under different resolutions. Strip-encoding and ZOrder-encoding translate a single disk geometry to a few tens of range scans when the tile size falls under 20 m.

Figure 6A:
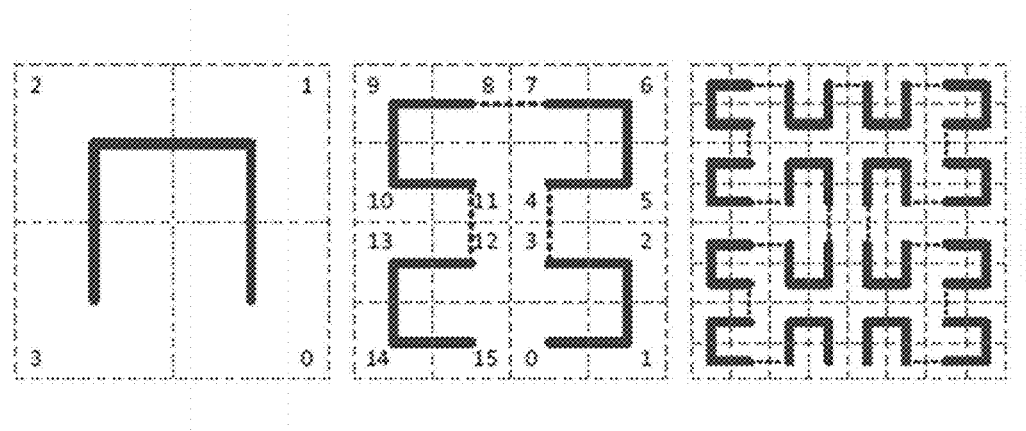
FIG. 6A exemplarily shows the Moore-encoding of the geometric translation circuit 101.

To reduce the number of range scans, it is preferable to employ the Moore-Encoding algorithm which is inspired by the Moore curve from the space-filling curve family. The Moore-encoding algorithm is exemplary shown in FIG. 4C. A Moore-Curve can be developed up to any resolution as shown in FIG. 6A, resolutions 1 and 2 of Moore encoding are special cases. The curve of resolution 1 is called a "unit component".

Figure 6B:
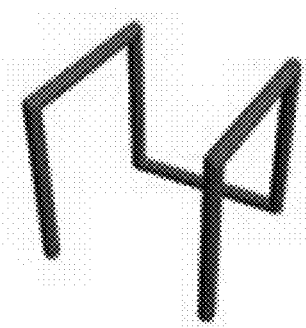
FIG. 6B exemplarily shows a 3-dimensional Moore curve of the Moore-encoding of the geometric translation circuit 101.
Figure 6C:
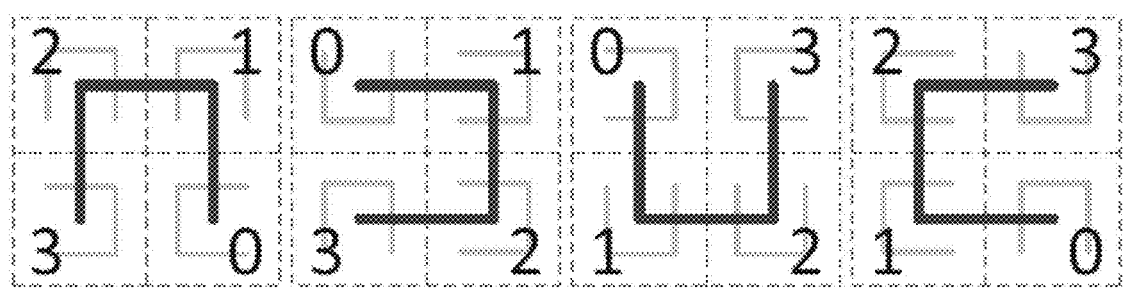
FIG. 6C exemplarily shows strategies of the Moore curve of the Moore-encoding of the geometric translation circuit 101.

In order to increase the resolution, the Moore curve expands each of its unit component according to a fixed strategy as shown in FIG. 6C. Experiment results plotted in FIG. 5 show that Moore-Encoding can reduce the number of range scans by 40% when compared to ZOrder-Encoding. Moore curves may generalize to higher dimensions. FIG. 6B exemplarily shows the simplest 3D Moore curve of resolution 1.

As shown in FIG. 6A, FIGS. 6B and 6C, each unit of the Moore curve can be uniquely defined by the combination of its orientation (north, east, south, and west) and its rotation (clockwise, counter-clockwise). The orientation is encoded with 2 bits, d1 and d0, such that 00 denotes north, 01 east, 10 south, and 11 west. The rotation of a Moore curve component unit completely depends on its orientation. Starting from the direction shown in FIG. 6A, the encodings in east and west oriented units rotate clockwise, and others rotate counter-clockwise. With a given integer coordinate (x,y), let $x_k$ and $y_k$ denote the $k^{th}$ lowest bits of x and y in the binary presentation. $d_{k,1}d_{k,0}$ is the orientation of the component unit defined by the highest r−k−1 bits in x, and y. Then, the orientation $d_{k-1,1}, d_{k-1,0}$ can be determined based on $d_k,1$, $d_k,0$, $x_k$, and $y_k$.

$$d_{k-1,0} = \overline{d}_{k,1}\overline{d}_{k,0}\overline{y}_k \mid \overline{d}_{k,1}d_{k,0}x_k \quad (1)$$
$$\mid d_{k,1}\overline{d}_{k,0}y_k \mid d_{k,1}d_{k,0}\overline{x}_k$$

$$= \overline{d}_{k,0}(d_{k,1} \oplus \overline{y}_k) \mid d_{k,0}(d_{k,1} \oplus x) \quad (2)$$

$$d_{k-1,1} = \overline{d}_{k,1}\overline{d}_{k,0}x_k\overline{y}_k \mid \overline{d}_{k,1}d_{k,0}\overline{x}_k y_k \quad (3)$$
$$\mid d_{k,1}\overline{d}_{k,0}\overline{x_k y_k} \mid d_{k,1}d_{k,0}\overline{x_k \overline{y}_k}$$

$$= d_{k,1}(\overline{x}_k \oplus y_k) \mid (x_k \oplus y_k)(d_0 \oplus x_k) \quad (4)$$

Formulas 1-4 consider situations where $d_{k-1},0$ and $d_{k-1},1$ should equal to 1, and uses a logic or to connect them all. The same technique in Formulas 1-4 can be applied to determine the final Moore encoding index "m".

$$m_{2k+1} = \overline{d}_{k,1}\overline{d}_{k,0}\overline{x}_k \mid \overline{d}_{k,1}d_{k,0}\overline{y}_k \quad (5)$$
$$\mid d_{k,1}\overline{d}_{k,0}x_k \mid d_{k,1}d_{k,0}y_k$$

$$= \overline{d}_{k,0}(d_{k,1} \oplus \overline{x}_k) + d_{k,0}(d_{k,1} \oplus \overline{y}_k) \quad (6)$$

$$m_{2k} = \overline{x}_k \oplus y_k \quad (7)$$

Based on Formulas 5-7 and the Moore encoding index "m", each geometry can be translated into range scans using a quad tree. Each level in the quad tree corresponds to a resolution level. Each node in the tree represents a tile, which is further divided into four smaller tiles in the next level. The translating algorithm of the geometric translation circuit 101 traverses deeper if the geometry query partially overlaps with that area as shown in FIG. 7. If an area is fully covered by the geometry, there is no need to go further downwards as shown in FIG. 7.

A geometry query 150 may translate into a large number of range scans output by the geometric translation circuit 101. Generally, the range scans usually force the underlying system to fetch more data or repeatedly go through the same data structure. The multi-scan optimization circuit 102 keeps tile size and block size small, and aggregately optimize range scans. In other words, the multi-scan optimization circuit 102 computes an optimal read strategy such that the IO latency is minimized.

That is, the multi-scan optimization circuit 102 performs read amplification because when translating geometry queries, range scans are generated respecting tile boundaries at the given resolution. But, tile boundaries may not align with the geometry query boundary. In order to cover the entire geometry, data from a larger area is fetched.

FIG. 5 plots the curve of read area amplification ratio, which is quantitatively defined as the total area of fetched tiles over the area of the geometry query. The curves show that, solely tuning the resolution cannot achieve both a small number of range scans and a low ratio of read area amplification. For example, as shown in FIG. 5, restricting each geometry query to generate less than 10 scans forces Pyro to fetch data from a 22% larger area. On the other hand, limiting the area amplification ratio to less than 5% leads to more than 30 range scans per geometry query.

Moreover, encoding tiles are stored into fixed-size DB blocks on disk, whereas DB blocks ignore the boundaries of encoding tiles. An entire DB block has to be loaded even when the target tile has only one key-value pair fell in that DB Block, which is read volume-amplification. It is noted that DB blocks are different from DFS blocks. DB blocks are the minimum read/write units in modified HBase. One DB block is usually only a few tens of KiloBytes (KB). In contrast, a DFS block is the minimum replication unit in modified HDFS. DFS blocks are orders of magnitudes larger than DB blocks. For example, the default modified HDFS block size is 64 MB, which is 1024 times larger than the default modified HBase block size.

The multi-scan optimization circuit 102 performs the read amplification which includes the read area amplification, read volume amplification, and redundant read phenomena. Read amplification can force a geometry query to load a significant amount of unnecessary data as well as visiting the same DB block multiple times, leading to a much longer response time.

That is, after the geometric translation circuit 101 translates the geometry query 150 into range scans, the multi-scan optimization circuit 102 uses two more pieces of information to minimize the response time: 1) storage media performance profiles, and 2) the mapping from key ranges to DB blocks. For the former one, an administrator may specify an RDFS path under the property name "hbase.profile.storage" in the hbase-site.xml configuration file. This path should point to a file containing multiple lines of (p-read size, p-read delay) items, indicating the storage media performance profile result. Depending on storage media types in physical servers, the administrator may set the property "hbase.profile.storage" to different values for different HRegions. The file will be loaded during HRegion initialization phase. For the latter one, HBase internally keeps indices of DB blocks. Therefore, the multi-scan optimization circuit 102 optimizes the translated range scan into a series of block starting offsets and block sizes. Then, those information will be provided as inputs for the $A^3$ algorithm (as described later).

According to FIG. 5, increasing the resolution can to alleviate read area amplification. Using smaller DB block sizes reduces read volume amplification. However, these changes require the system 100 to fetch significantly more DB blocks, pushing disk IO to become a throughput bottleneck. In order to minimize the response time, the multi-scan optimization circuit 102 optimizes all range scans of the same geometry query aggregately, such that multiple DB blocks can be fetched within fewer disk read operations. There are several reasons for considering IO optimizations in the DB layer rather than relying on asynchronous IO scheduling policies in the DFS layer or the Operating System layer. First, issuing a DFS read request is not free. As a geometry query may potentially translate into a large number of read operations, maintaining those reads alone elicits extra over-head in all three layers. Second, the performance of existing IO optimizations in lower layers depends on the timing and ordering of request submissions. As p-read requests generated by the same geometry query may not maintain the perfect order, which will force lower layer IO schedulers to miss optimization opportunities. Third, as servers using the system 100 have global knowledge about all p-reads of each same geometry request, it is the natural place to implement IO optimizations.

The multi-scan optimization circuit 102 tunes the tradeoff between unnecessarily reading more DB blocks and issuing more disk seeks (i.e., determines the optimal read strategy).

To determine the optimal read strategy, the multi-scan optimization circuit 102 uses an Adaptive Aggregation Algorithm ($A^3$). $A^3$ uses the p-read profiling result to estimate delay of p-read operations. The pro-filing result contains the p-read response time of various sizes. $A^3$ applies interpolation to fill in gaps between pro-filed p-read sizes.

$A^3$ algorithm considers a geometry query 150 that the geometric translation circuit 101 translated to a set Q of range scans. Block indices help to convert those range scans into another set B' of blocks, sorted by the ascending order of their offsets. By removing all cached blocks from B', $A^3$ gets set B of n requested but not cached blocks. In formula 8, S[i] is defined as the estimated minimum delay of loading the first "i" blocks. Then, the problem is to solve S[n]. For any optimal solution, there must exist a k, such that blocks k to n are fetched using a single p-read operation. In other words, S[n]=S[k−1]+ESTIMATE(k,n), where ESTIMATE (k,n) estimates the delay of fetching blocks from k to n together based on the profiling result. Therefore, starting from S[0], $A^3$ calculates S[i] as min{S[k−1]+ESTIMATE(k, i)|1≤k≤i} (i.e., formula 8).

$$S[i]=\min\{S[j-1]+E(j,i)|1\le j\le i\} \quad (8)$$

The pseudo code of $A^3$ is presented in Algorithm 1 below.

---

ALGORITHM 1

Input: blocks to fetch sorted by offset B
Output: block ranges to fetch R
1  S ← an array of size |B|, initialize to ∞
2  P ← an array of size |B|
3  S[0] ← 0
4  for i ← 1 ~ |B| do
5  | for j ← 0 ~ i − 1 do
6  | | k = i − j
7  | | s ← ESTIMATE(k,i) +S[k − 1]
8  | | if s < S[i] then
9  | | | S[i] ← s
10 | | | P[i] ← k
11 i ← |B|; R ← ∅
12 While i > 0 do
13 | R ← R ∪ (P[i],i)
14 | i ← P[i] − 1
15 return R

---

In the Algorithm 1 shown above, the nested loop between line 4-10 leads to O(|B|2) computational complexity. If B is large, the quadratic computational complexity explosion can be easily mitigated by setting an upper bound on the position read size. For example, for the hard drive profiled in FIG. 6, fetching ×107 bytes result in about the same delay as fetching 5×106 bytes twice. Therefore, there is no need to issue position read larger than 107 bytes. If block size is set to 64 KB, the variable j on the 5th line in Algorithm 1 only needs to loop from 0 to 76, resulting in linear computational complexity.

The determination circuit 103 determines if the optimal read strategy is achieved by the $A^3$ algorithm. If the optimal read strategy is achieved, then the spatial-temporal storage system 100 proceed to the block grouping circuit 104. If the optimal read strategy is not achieved, then the spatial-temporal storage system 100 proceeds back to the geometric translation circuit 101 and applies the Moore encoding algorithm to calculate scan ranges again.

The block grouping circuit 104 relies on the group-based replica placement policy in modified HDFS (to be described later) to guarantee data locality during region splits. To achieve that, the block grouping circuit 104 divides each StoreFile into multiple shards based on user-defined pre-split keys. Then, the block grouping circuit 104 organizes DFS replicas of all shards into elaborately designed groups. Replicas in the same group are stored in the same physical server. After one or multiple splits, each daughter region finds at least one replica of all its region data within one group. To preserve data locality, the block grouping circuit 104 moves the daughter region into the physical server hosting that group.

That is, Moore encoding concentrates range scans of the geometry query 150 into fewer servers. This problem may lead to performance degradation when spatial-temporal hotspots exist. To handle moving hotspots, a region needs to split to multiple daughters to make use of resources on multiple physical servers. Later, those daughter regions may merge back after their workloads shrink. Thus, the block grouping circuit 104 keeps both split and materialization operations light, allowing the system 100 to react quickly when a hotspot emerges.

It is noted that the block grouping circuit 104 performs the group-based replica placement policy and is replica group management as shown in the HDFS level of FIG. 3.

Figure 8:
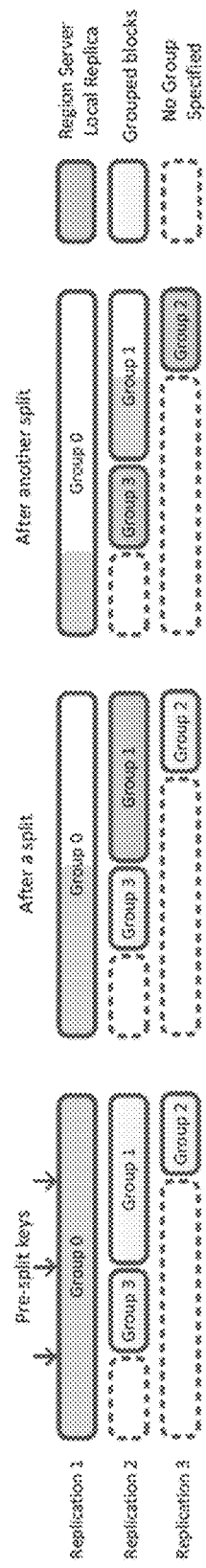
FIG. 8 exemplarily shows splitting of groups by a block grouping circuit 104.

As shown in FIG. 8, split keys divide StoreFiles into shards, and help to organize DFS block replicas into replica groups. The modified DFS including the block groping circuit 104 respects predefined split keys. To achieve that, the block grouping circuit 104 stops writing into the current DFS block and starts a new one as soon as it reaches a predefined split key. The block grouping circuit 104 assumes that, although moving hotspots may emerge in spatial-temporal applications, the long-round popularity of different geographic regions changes slowly.

Referring generally to FIG. 8, the block grouping circuit 104 assumes blocks are replicated r times and there are $2^{r-1}-1$ predefined split keys within a given region. Split keys divide the region key space into $2^{r-1}$ shards, resulting in $r \cdot 2^{r-1}$ shard replicas. "Group 0" contains one replica from all shards. Other groups can be constructed following a recursive procedure by the block grouping circuit 104. That is, the block grouping circuit 104 performs three steps. Step 1 lets Ψ be the set of all shards. If Ψ contains only one shard, stop. Otherwise, use the median split key κ in Ψ to divide all shards into two sets A and B. Keys of all shards in A are larger than κ, while keys of all shards in B are smaller than κ. Step 2 and, then Step 3 are performed. In Step 2, create a new group to contain one replica from all shards in set A. Then, let Ψ←A, and the block grouping circuit 104 recursively applies Step 1. In Step 3, the block grouping circuit 104 lets Ψ←B, and then recursively applies step 1.

The block grouping circuit 104 performs the group-based replica placement policy such that replicas in the same group are stored in the same physical server, whereas different groups of the same region are placed into different physical servers. According to the construction procedure as exemplarily shown in FIG. 8, group 1 starts from the median split key, covering the bottom half of the key space (i.e., $2^{r-2}$ shards). Group 1 allows half of the regions workload to be moved from "group 0's" server to group 1's server without sacrificing data locality. FIG. 8 further demonstrates an example of r=3. The modified HDFS including the block grouping circuit 104 is compatible with normal HDFS workload whose replicas can be simply set as no group specified.

FIG. 8 further shows how the block grouping circuit 104 makes use of DFS block replicas (i.e., manages). The shaded area indicates which replica serves workloads falling in that key range. In the beginning, there is only one region server. Replicas in "group 0" take care of all workloads. As all replicas in "group 0" are stored locally in the region's physical server, data locality is preserved. After one split, the daughter region with smaller keys stays in the same physical server, hence still enjoys data locality. Another daughter region moves to the physical server that hosts replica "group 1", which is also able to serve this daughter region using local data. Subsequent splits are carried out under the same fashion.

To distinguish from the original split operation in HBase, the above actions by the block grouping circuit 104 in the modified HDFS are called a "soft split operation". Soft splits are designed to mitigate moving hotspots. Daughter regions created by soft splits eventually merge back to form their parent regions. The efficiency of the merge operation is not a concern as it can be performed after the hotspot moves out of that region. Note that the original split operation, which is a hard split (i.e., pre-split based on expected data distribution to gain initial load balancing among region servers in the HBase level), is still needed when a region grows too large to fit in one physical server.

The block grouping circuit 104 can utilize various Applicant Program Interfaces (APIs) to achieve the above described configuration. For example, a "Sealing a DFS Block" API can be used such that the modified HBase may force the block grouping circuit 104 to seal the current DFS block and start writing into a new DFS block, even if the current DFS block has not reached its size limit yet. This API can be used because DFS block boundaries may not respect splitting keys, especially when there are many StoreFiles in a region and the sizes of StoreFiles are about the same order of magnitude of the DFS block size. The seal API family will help StoreFiles to achieve full data locality after splits.

The block grouping circuit 104 can utilize a second exemplary API called "Grouping Replicas" in which the modified HBase may specify replica namespace and replica groups when calling the write API in modified HDFS. This usually happens during MemStore flushes and StoreFile compactions. Under the same namespace, replicas in the same replica group will be placed into the same physical server, and replicas in different groups will be placed into different physical servers. If there are not enough physical servers or disk spaces, the modified HDFS works in a preferred effort manner. The mapping from the replica group to the physical server and corresponding failure recovery is handled within modified HDFS. The modified HBase may retrieve a physical server information of a given replica group using grouping APIs, which allows the modified HBase to make use of data locality benefits.

The block grouping circuit 104 is enabled by adding 891 lines of code into HDFS to enable group-based replica placement policy. The geometric translation circuit 101, the multi-scan optimization circuit 102, and the determination circuit 103 adds 7344 lines of code into HBase to achieve the functionality of the circuits. That is, the spatial-temporal storage system 100 improves the functionality and efficiency of the computer itself.

Figure 2:
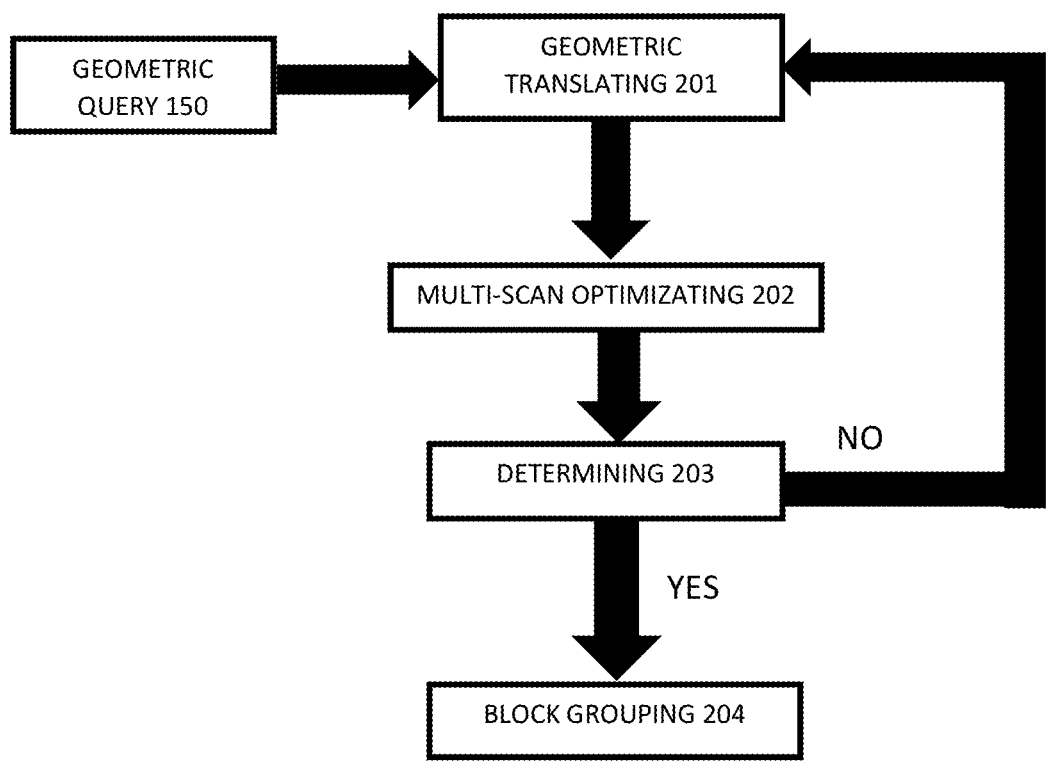
FIG. 2 exemplarily shows a high level flow chart for a spatial-temporal storage method 200.

FIG. 2 shows a high level flow chart for a method 200 of spatial-temporal storage.

Step 201 receives a geometric query 150 and encodes spatial-temporal information into row keys and translates the geometry query 150 into range scans.

Step 202 keeps tile size and block size small, and aggregately optimizes range scans of Step 201. In other words, Step 202 computes an optimal read strategy such that the IO latency is minimized.

Step 203 determines the target of the agenda 150 by determining a set of target topics, who should be talking, the location of the meeting, etc.

Step 203 determines if the optimal read strategy is achieved by Step 202. If the optimal read strategy is achieved, then the method 200 proceeds to Step 204. If the optimal read strategy is not achieved, then the method proceeds to loop back to Step 201 and repeats/applies the Moore encoding algorithm to calculate scan ranges again.

Step 204 performs the group-based replica placement policy such that replicas in the same group are stored in the same physical server, whereas different groups of the same region are placed into different physical servers Experimental Results and Evaluation Experimentation and evaluation of the invention has been done using New York City taxi dataset that contains GPS pickup/dropoff location information of 697,622,444 trips from 2010 to 2013. The experiments run on a cluster of 80 Dell servers (40 Dell PowerEdge R620 servers and 40 Dell PowerEdge R610 servers). The HDFS cluster consists of 1 master node and 30 datanodes. The HBase server contains 1 master node, 3 zookeeper nodes, and 30 region servers. Region servers are co-located with data nodes. Remaining nodes follow a central controller to generate geometry queries and log response times, which we call Remote User Emulator (RUE).

Evaluation of the performance improvements contributed by the Geometry Translator (i.e., the geometric translation circuit 101), Multi-Scan Optimizer (i.e., multi-scan optimization circuit 102), and Group-based Replica Placement (i.e., block grouping circuit 104) are each described in turn below. Also, the overall response time and throughput of the system 100 are discussed.

Figure 9A:
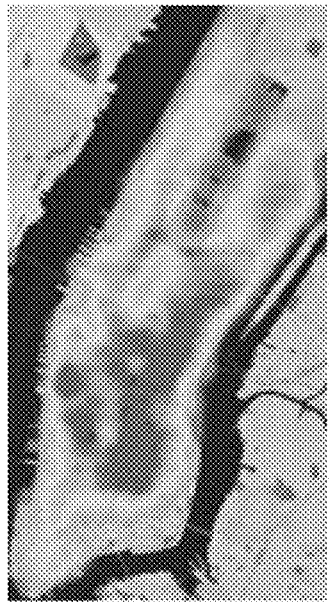
FIG. 9A exemplarily shows a heat map of taxi pick-up and drop-off events in the Manhattan area during a 4-hour time slot starting from 8:00 PM on Dec. 31, 2010.
Figure 9B:
FIG. 9B exemplarily shows a heat map of taxi pick-up and drop-off events in the Manhattan area during a 4-hour time slot starting from 8:00 PM on Dec. 31, 2012.
Figure 9C:
FIG. 9C exemplarily shows a heat map of taxi pick-up and drop-off events in the Manhattan area during a 4-hour time slot starting from 6:00 AM on Jan. 1, 2013.
Figure 9D:
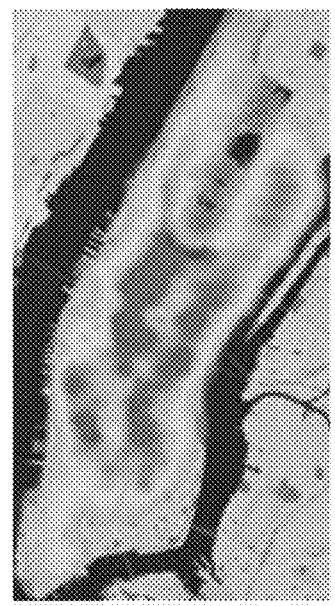
FIG. 9D exemplarily shows a heat map of taxi pick-up and drop-off events in the Manhattan area during a 4-hour time slot starting from 8:00 PM on Jul. 4, 2013.

First, the taxi data is discussed. Moving hotspot is an important phenomenon in spatial-temporal data. FIG. 9A and FIG. 9B show the heat maps of taxi pick-up and drop-off events in the Manhattan area during a 4-hour time slot starting from 8:00 PM on Dec. 31, 2010 and Dec. 31, 2012 respectively. The comparison shows that the trip distribution during the same New Year's Eve festivities does not change much over the years. FIG. 9C plots the heat map of the morning (6:00 AM-10:00 AM) on Jan. 1, 2013, which drastically differs from the heat map shown in FIG. 9B. FIG. 9D illustrates the trip distribution from 8:00 PM to 12:00 AM on Jul. 4, 2013, which also considerably differs from that of New Year's Eve in the same year.

Figure 10:
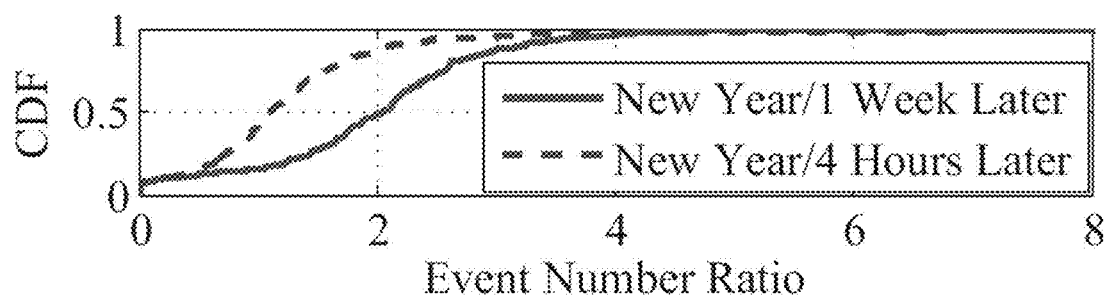
FIG. 10 exemplarily shows a CDF of event count ratio in tiles.

FIGS. 9A-9D demonstrate the distribution of spatial-temporal hotspots. It is also important to under-stand the limit a hotspot may grow. The Manhattan area is divided into 16×16 tiles. FIG. 10 shows the CDF of event count ratio in tiles. Although hotspots move over time, the popularity of a region changes within a reasonably small range. During New Year's midnight, popularity of more than 98% regions grows within seven fold.

Figure 11:
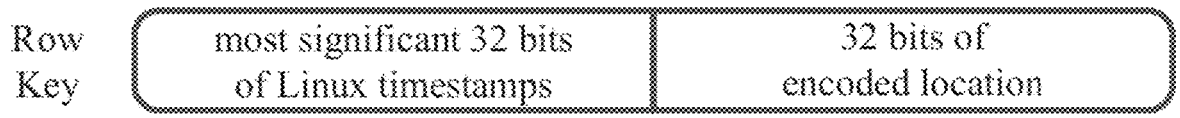
FIG. 11 exemplarily shows the temporal-key concatenated in front of the spatial key to form the complete row key.

When loading the data into HBase, both spatial and temporal information contribute to the row key. The encoding algorithm translates the 2D location information of an event into a 32-bit spatial-key, which acts as the suffix of the row key. Then, the temporal strings are parsed to Linux 64-bit timestamps. The most significant 32 bits are truncated as the temporal-key. Each temporal key represents roughly a 50-day time range. Finally, as shown in FIG. 11 the temporal-key is concatenated in front of the spatial key to form the complete row key.

Figure 12A:
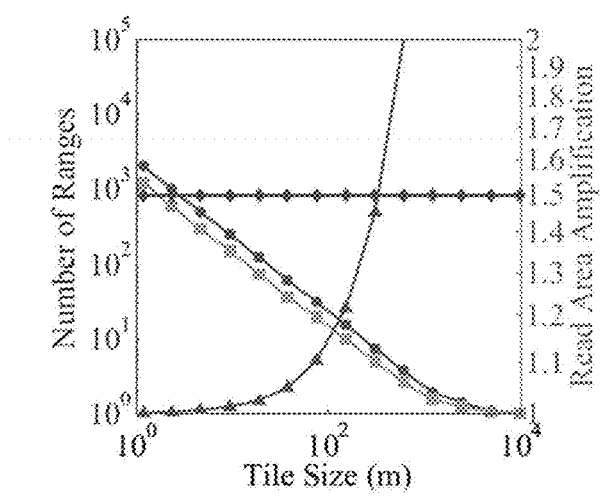
FIG. 12A exemplarily shows how much Moore-encoding reduces the number of range scans at different resolutions when translating geometry queries 150 in a first range.
Figure 12B:
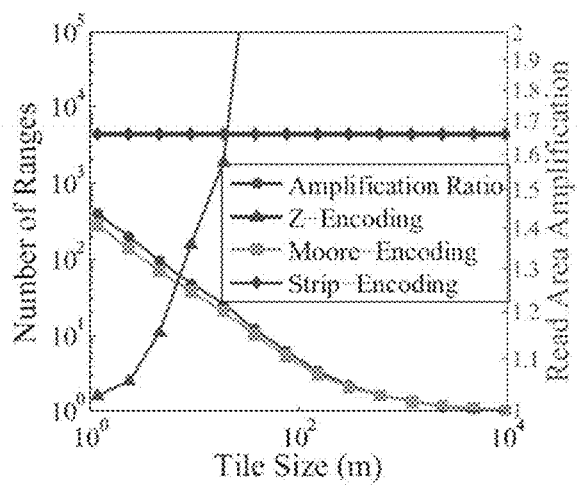
FIG. 12B exemplarily shows how much Moore-encoding reduces the number of range scans at different resolutions when translating geometry queries 150 in a second range.

Turning to the experimentation results of the geometric translation circuit 101, FIG. 12A and FIG. 12B show how much Moore encoding helps to reduce the number of range scans at different resolutions when translating geometry queries in a 40,000,000 m×40,000,000 m area. FIGS. 12A and 12B use disk geometry and rectangle geometries respectively. For disk geometries, Moore encoding generates 45% fewer range scans when compared to ZOrder-encoding. When a long rectangle is in use, Moore encoding helps to reduce the number of range scans by 30%.

Figure 13A:
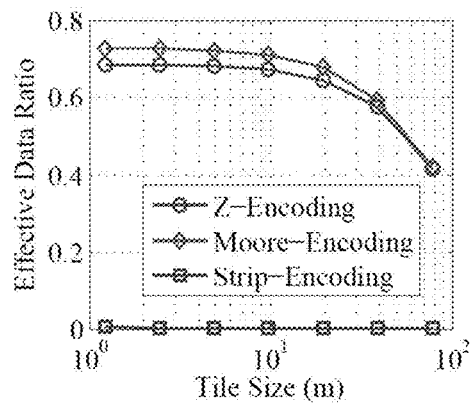
FIG. 13A exemplarily shows a ratio of fetched key-value pairs volume over the total volume of accessed DB Blocks, which is the inverse of read volume amplification.

To quantify the read volume amplification, the dataset coordinates is encoded with the Moore encoding algorithm using the highest resolution shown in FIG. 5, and the data is populated using 64 KB DB Blocks. Then, the experiment issues 1 Km×1 Km rectangle geometries. FIG. 13A shows the ratio of fetched key-value pairs volume over the total volume of accessed DB Blocks, which is the inverse of read volume amplification. As the Strip-encoding results in very high read volume amplification, using the inverse helps to limit the result in interval [0, 1]. Therefore, readers can easily distinguish the difference between Moore-encoding and ZOrder-encoding can be easily distinguished. The inverse metric is called the "effective data ratio". As Moore encoding concentrates a geometry query into fewer range scans, and hence fewer range boundaries, it also achieves higher effective data ratio.

Figure 13B:
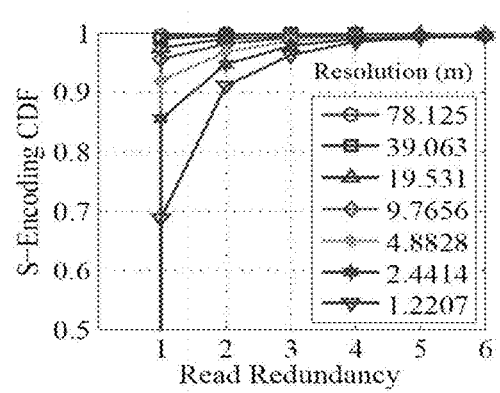
FIGS. 13B to 13D exemplarily plot the CDFs of redundant read counts when processing the same geometry query 150 for each of the encoding.
Figure 13C:
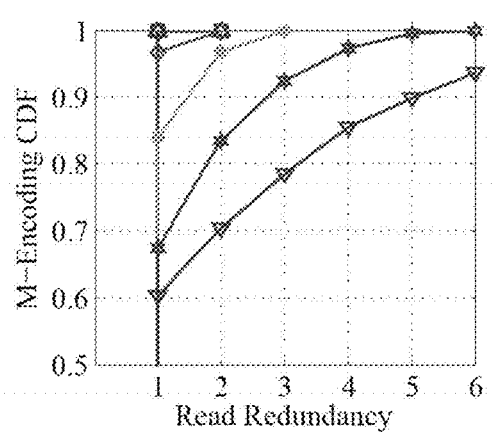
Figure 13D:
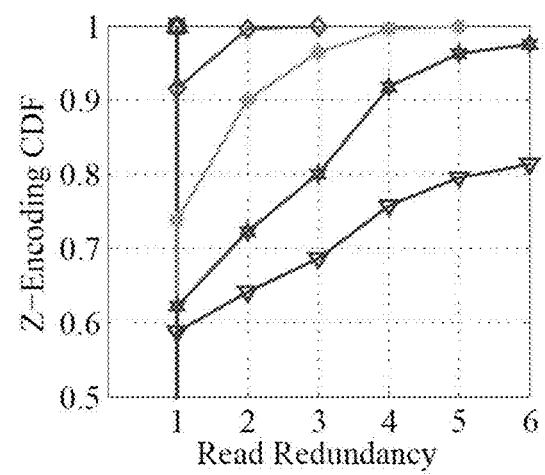

FIGS. 13B-13D plot the CDFs of redundant read counts when processing the same geometry query. It is clear that the number of redundant reads increases when using higher resolutions. Another observation is that Moore-encoding leads to large read redundancy. Thanks to the multi-scan optimization design, this will not be a problem, as all redundant reads will be accomplished within a single DB block traverse operation.

Turning to the experimentation results of the multi-scan optimization circuit 102 and in order to measure how $A^3$ algorithm works, the NYC taxi cab dataset is loaded using Moore encoding algorithm, and force all StoreFiles of the same store to be compacted into one single StoreFile. Then, the RUE generates 1 Km×1 Km rectangle geometry queries with the query resolution set to 13. The internal delay of loading requested DB blocks is measured individually versus aggregately.

Figure 14:
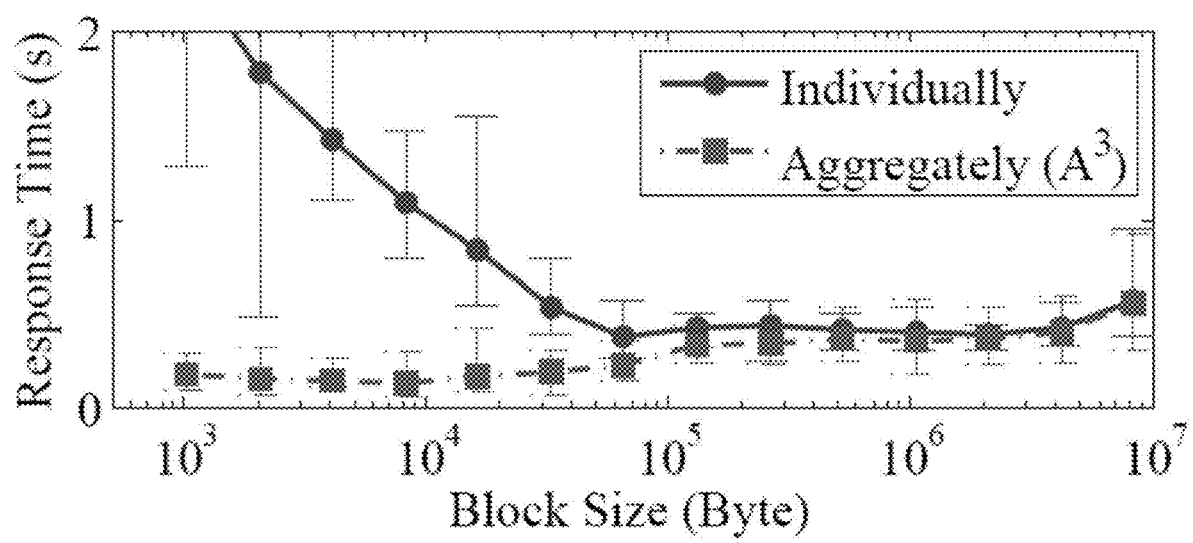
FIG. 14 exemplarily shows results of internal delay of loading requested DB blocks measured individually versus aggregately.

The evaluation results are shown in FIG. 14. The curves convey a few interesting observations. In general, the $A^3$ curve of FIG. 14 curve rises as the block size increases, which agrees with the intuition as larger blocks lead to more severe read volume amplification. The minimum response time is achieved at 8 KB. Because the minimum data unit of the disk under test is 4 KB, further decreasing block size does not help any more. On the computation side, using smaller block size results in larger input scale for the $A^3$ algorithm. This explains why the response time below 8 KB slightly goes up as the block size decreases. The Md-HBase curve monotonically decreases when the block size grows from 1 KB to 100 KB. It is because increasing block size significantly reduces the number of disk seeks when the block is small. When the block size reaches between 128 KB and 4 MB, two facts become true: 1) key-value pairs hit by a geometry query tend to concentrate in less blocks; 2) and data transmission time starts to make impacts. The benefits of reducing the number of disk seeks and the penalties of loading DB blocks start to cancel each other, leading to a flat curve. After 4 MB, the data transmission delay dominates the response time, and the curve rises again. Comparing the nadirs of the two curves concludes that $A^3$ helps to reduce the response time by at least 3×.

Turning to the evaluation of the block group circuit 104, to measure the exact performance of soft splitting, experiments used normal scan queries instead of geometry queries, excluding the benefits of Moore encoding and multi-scan optimization. A table is created for the NYC's taxi data, which initially splits into 4 regions. Each region is assigned to a dedicated server. The HBASE HEAPSIZE parameter is set to 1 GB, and the MemStore flush size is set to 256 MB. Automatic region split is disabled to allow us to manually control the timing of splits. Twelve RUE servers generate random-sized small scan queries. Each RUE server spawns 20 threads. Each thread generates a scan query every 10 ms on average. The time interval between two scan queries is a random variable following the exponential distribution.

Figure 15:
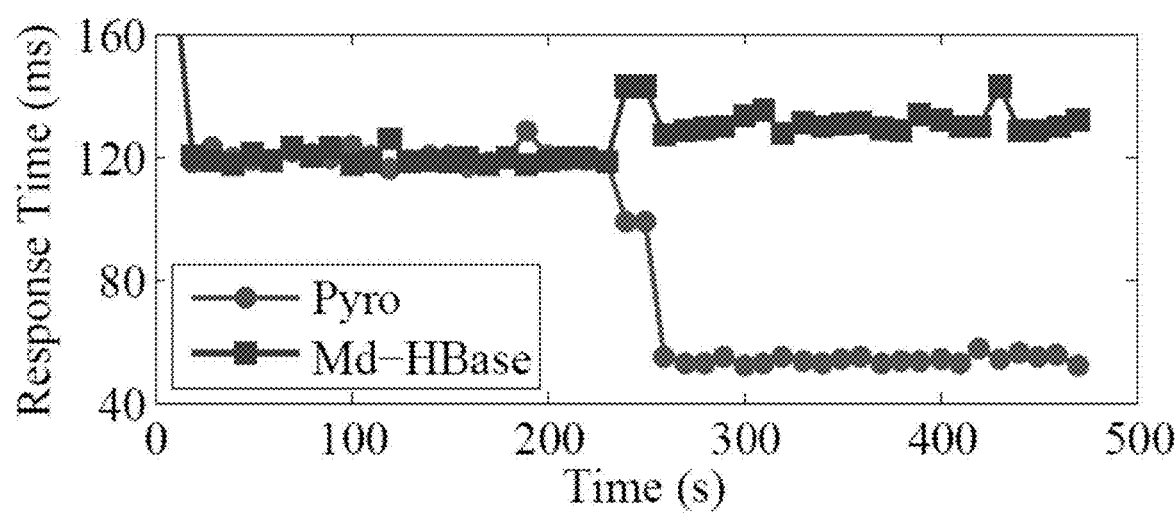
FIG. 15 exemplarily shows experimental results for the response times of the system 100 versus an unmodified HBase system.

FIG. 15 shows the result. The split occurs at 240 seconds. After the split operation, HBase suffers from even longer response time. It is because daughter region B does not have its region data in its own physical server, and has to fetch data from remote servers, including the one hosting daughter region A. When the group-based replication is enabled, both daughter regions read data from local disks, reducing half of the pressure on disk, central processing unit, and network resources.

Figure 16:
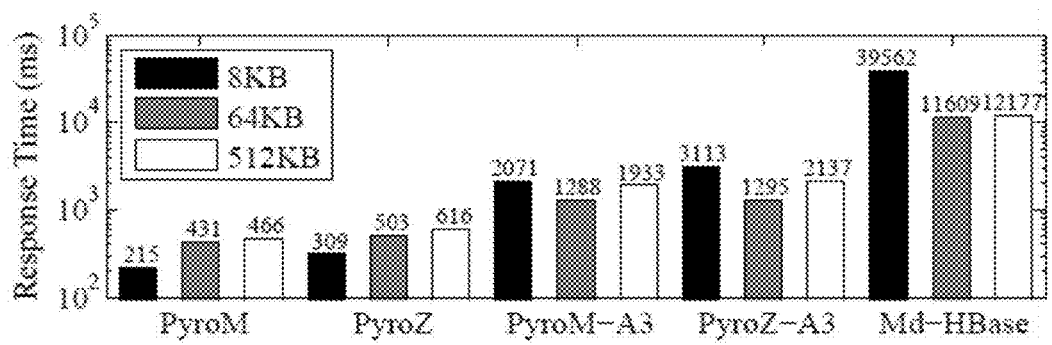
FIG. 16 exemplarily shows experimental results for different versions of the system 100 and the unmodified HBase system.
Figure 17:
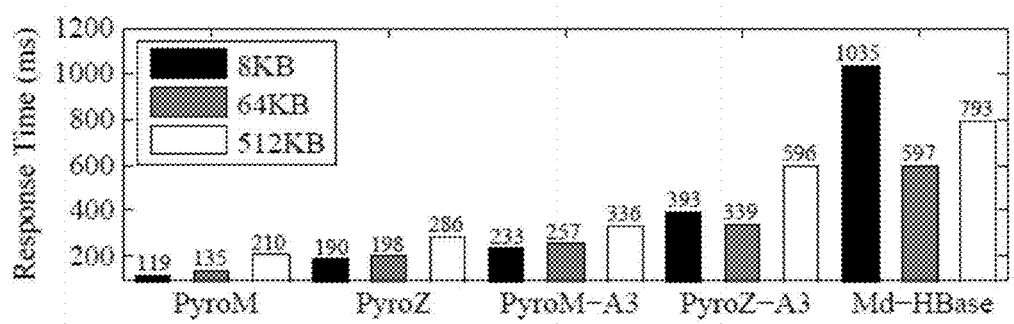
FIG. 17 exemplarily shows experimental results for different versions of the system 100 and the unmodified HBase system.

Based on the entire system 100, the overall response time and throughput was measured and improved by using the system 100 compared to the state-of-the-art solution MD-HBase. Experiments submit rectangle geometry queries of size 1 Km×1 Km and 100 m×100 m to Pyro and MD-HBase. The request resolutions are set to 13 and 15 respectively for two types of rectangles. The block sizes vary from 8 KB to 512 KB. When using MD-HBase, the remote query emulator initiates all scan queries sequentially using one thread. This configuration tries to make the experiment fair, as the system 100 uses a single thread to answer each geometry query. Besides, experiments also show how the system 100 performs when using ZOrder-encoding or/and $A^3$ algorithm. FIG. 16 and FIG. 17 plot experiment results. The legend on the upper-left corner shows the mapping from colors to block sizes. It is noted that system 100 is called "Pyro". PyroM and PyroZ represent Pyro using Moore-encoding and ZOrder-encoding, respectively. PyroM-$A^3$ and PyroZ-$A^3$ correspond to the cases with the $A^3$ algorithm disabled.

Figure 18:
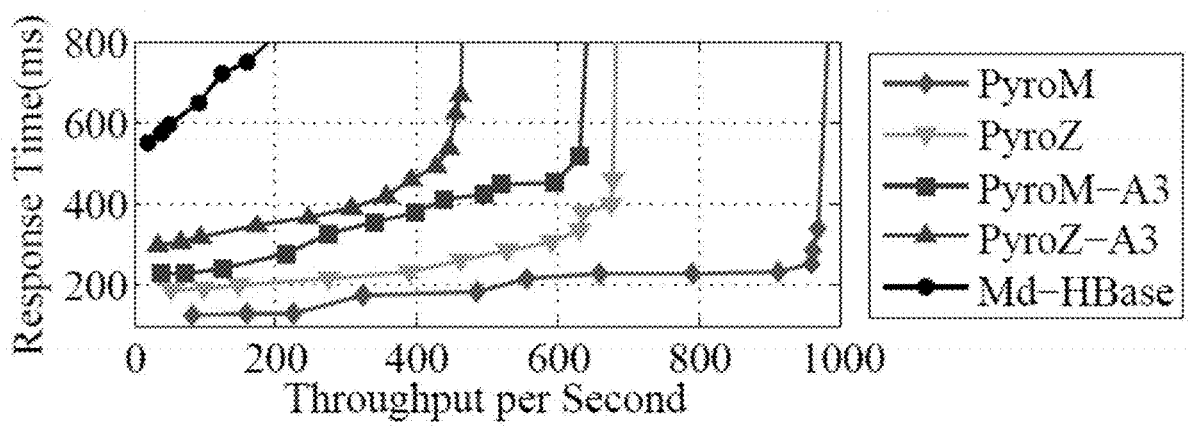
FIG. 18 exemplarily shows the through-put evaluation results of the system 100.

When using PyroM and PyroZ, the response times grow with the increase of block size regardless of whether the rectangle geometry is large or small. It is because larger blocks weaken the benefits of block ag-gregation and forces PyroM and PyroZ to read more data from disk. After disabling $A^3$, the response time rises by 6× for 1 Km×1 Km rectangle geometries, and 2× for 100 m×100 m rectangle geometries. MD-HBase achieves the shortest response time when using 64 KB DB blocks, which is 60× larger compared to PyroM and PyroZ when handling 1 Km×1 Km rectangle geometries. Reducing the rectangle size to 100×100 helps to close the gap to 5×. An interesting phenomenon is that using 512 KB DB blocks only increases the response time by 5% compared to using 64 KB DB blocks, when the request resolution is set to 13. However, the gap jumps to 33% if the resolution is set to 15. The reason is that, higher resolution leads to more and smaller range scans. In this case, multiple range scans are more likely to hit the same DB block multiple times. According to HFile format, key-value pairs are chained together as a linked-list in each DB block. HBase has to traverse the chain from the very beginning to locate the starting key-value pair for every range scan. Therefore, larger DB block size results in more overhead on iterating through the key-value chain in each DB block. FIG. 18 shows the through-put evaluation results of the entire cluster. Pyro regions are initially partitioned based on the average pick up/drop off event location distribution over the year of 2013. During the evaluation, each RUE server maintains a pool of emulated users who submit randomly located 100 m×100 m rectangle geometry queries. The reason for using small geometries in this experiment is that MD-HBase results in unacceptable long delay when handling even a single large geometry. The distribution of the rectangle geometry queries follows the heap map from 8:00 PM to 12:00 AM on. Dec. 31, 2013. The configuration mimics the situation where an application only knows the long-term data distribution, and is unable to predict hotspot bursts. When setting 600 ms to be the maximum tolerable response time, Pyro outperforms MD-HBase by 10×.

In conventional HBase and HDFS, the first replica is placed on the writer node, the remaining replicas are randomly placed on remote servers. When splitting a region, no matter which physical server the daughter region server is moved into, it partly loses the benefits of data locality, and has to fetch data remotely from other servers. This disadvantage gets worse when the cluster grows larger.

With the modified HBase of the first layer and the modified HDFS of the second layer, the system 100 can specify replica groups when writing data into the HDFS. Replicas in the same groups will be placed into the same data node. Moreover, block boundaries can be made to respect split keys. Therefore, a daughter region server can be moved into a remote physical server without sacrifice data locality.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 19, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 19, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 20, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 21, a set of functional abstraction layers provided by cloud computing environment 50 (FIG.

20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the spatial-temporal storage system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A spatial-temporal storage system, comprising:
a processor;
a memory, the memory storing instructions to cause the processor to perform:
managing a plurality of region servers based on a result of querying spatial-temporal data in noSQL databases, wherein the noSQL databases are organized into a 3D table of rows, columns and cell version, wherein each column belongs to a column family, wherein the 3D table is stored as a key-value store that consists of row key, column family key, column qualifier, and timestamp, and wherein the key-value store contains the data stored in a cell, wherein each region of the plurality of region servers is served by an HRegion instance, wherein the HRegion instance manages each column family using a store, and wherein each store contains a memory storage and multiple store files;
sorting and flushing all key-value pairs, in the memory storage, into a new store when the memory storage reaches a pre-defined flush threshold;
splitting the HRegion instance into two daughter regions when a size of the store increases beyond a threshold, wherein the two daughter regions initially create reference files pointing back to the multiple store files of their past parent region, thus achieving responsive elasticity;
calculating scan ranges via a geometric translation circuit that applies a Moore-curve based geo-location encoding algorithm, wherein a space of a geometric query is recursively divided into tiles using a quad-tree, and wherein the tiles are encoded using a space filling curve, and wherein the Moore-curve based geo-location encoding algorithm preserves spatial continuity on the memory storage for put, get, and scan queries;
casting, by the geometric translation circuit, 2D coordinates (x, y) into a one-dimensional key space to store the spatial-temporal data;
utilizing smaller database blocks to reduce read volume amplification; and
optimizing scan ranges of a same geometry query aggregately, such that multiple database blocks are fetched within fewer disk read operations.

2. The spatial-temporal storage system of claim 1, wherein the plurality of region servers are managed via a group-based replica placement policy to guarantee data locality during region splits, and
wherein the group-based replica placement policy divides parts of the spatial-temporal data into multiple shards based on user-defined pre-split keys.

3. A non-transitory computer-readable recording medium recording a spatial-temporal storage program, the spatial-temporal storage program causing a computer to perform:
managing a plurality of region servers based on a result of querying spatial-temporal data in noSQL databases, wherein the noSQL databases are organized into a 3D table of rows, columns and cell version, wherein each column belongs to a column family, wherein the 3D table is stored as a key-value store that consists of row key, column family key, column qualifier, and timestamp, and wherein the key-value store contains the data stored in a cell, wherein each region of the plurality of region servers is served by an HRegion instance, wherein the HRegion instance manages each column family using a store, and wherein each store contains a memory storage and multiple store files;

sorting and flushing all key-value pairs, in the memory storage, into a new store when the memory storage reaches a pre-defined flush threshold;

splitting the HRegion instance into two daughter regions when a size of the store increases beyond a threshold, wherein the two daughter regions initially create reference files pointing back to the multiple store files of their past parent region, thus achieving responsive elasticity;

calculating scan ranges via a geometric translation circuit that applies a Moore-curve based geo-location encoding algorithm, wherein a space of a geometric query is recursively divided into tiles using a quad-tree, and wherein the tiles are encoded using a space filling curve, and wherein the Moore-curve based geo-location encoding algorithm preserves spatial continuity on the memory storage for put, get, and scan queries;

casting, by the geometric translation circuit, 2D coordinates (x, y) into a one-dimensional key space to the store spatial-temporal data;

utilizing smaller database blocks to reduce read volume amplification; and optimizing scan ranges of a same geometry query aggregately, such that multiple database blocks are fetched within fewer disk read operations.

4. The non-transitory computer-readable recording medium of claim 3, wherein the plurality of region servers are managed via a group-based replica placement policy to guarantee data locality during region splits, and wherein the group-based replica placement policy divides parts of the spatial-temporal data into multiple shards based on user-defined pre-split keys.

5. A spatial-temporal storage method, comprising:

managing a plurality of region servers based on a result of querying spatial-temporal data in noSQL databases, wherein the noSQL databases are organized into a 3D table of rows, columns and cell version, wherein each column belongs to a column family, wherein the 3D table is stored as a key-value store that consists of row key, column family key, column qualifier, and timestamp, and wherein the key-value store contains the data stored in a cell, wherein each region of the plurality of region servers is served by an HRegion instance, wherein the HRegion instance manages each column family using a store, and wherein each store contains a memory storage and multiple store files;

sorting and flushing all key-value pairs, in the memory storage, into a new store when the memory storage reaches a pre-defined flush threshold;

splitting the HRegion instance into two daughter regions when a size of the store increases beyond a threshold, wherein the two daughter regions initially create reference files pointing back to the multiple store files of their past parent region, thus achieving responsive elasticity;

calculating scan ranges via a geometric translation circuit that applies a Moore-curve based geo-location encoding algorithm, wherein a space of a geometric query is recursively divided into tiles using a quad-tree, and wherein the tiles are encoded using a space filling curve, and wherein the Moore-curve based geo-location encoding algorithm preserves spatial continuity on the memory storage for put, get, and scan queries;

casting, by the geometric translation circuit, 2D coordinates (x, y) into a one-dimensional key space to store the spatial-temporal data;

utilizing smaller database blocks to reduce read volume amplification; and optimizing scan ranges of a same geometry query aggregately, such that multiple database blocks are fetched within fewer disk read operations.

6. The spatial-temporal storage method of claim 5, wherein the plurality of region servers are managed via a group-based replica placement policy to guarantee data locality during region splits, and wherein the group-based replica placement policy divides parts of the spatial-temporal data into multiple shards based on user-defined pre-split keys.

* * * * *